United States Patent
Cheng et al.

(10) Patent No.: US 9,536,007 B2
(45) Date of Patent: *Jan. 3, 2017

(54) METHOD FOR LOCATION-BASED ASSET MANAGEMENT

(75) Inventors: Charles C. Cheng, Redmond, WA (US); Xinguo Wei, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/489,991

(22) Filed: Jun. 23, 2009

(65) Prior Publication Data

US 2009/0259573 A1    Oct. 15, 2009

Related U.S. Application Data

(63) Continuation of application No. 10/939,366, filed on Sep. 14, 2004, now Pat. No. 7,579,960, which is a continuation of application No. 09/326,088, filed on Jun. 4, 1999, now Pat. No. 6,806,813.

(60) Provisional application No. 60/113,167, filed on Dec. 21, 1998.

(51) Int. Cl.
*G05B 23/02* (2006.01)
*G06F 17/30* (2006.01)
*G06Q 10/08* (2012.01)

(52) U.S. Cl.
CPC ......... *G06F 17/3087* (2013.01); *G06Q 10/087* (2013.01)

(58) Field of Classification Search
CPC .... G06Q 30/06; G06Q 10/087; G06F 17/3087

USPC ................. 340/5.9, 870.02, 870.11
See application file for complete search history.

(56) References Cited

U.S. PATENT DOCUMENTS

| | | | |
|---|---|---|---|
| 4,914,420 A | | 4/1990 | Khan |
| 5,159,685 A | | 10/1992 | Kung |
| 5,263,080 A | | 11/1993 | Jones et al. |
| 5,278,568 A | | 1/1994 | Enge et al. |
| 5,485,163 A | * | 1/1996 | Singer et al. ................. 342/457 |
| 5,519,403 A | | 5/1996 | Bickley et al. |
| 5,539,881 A | | 7/1996 | Hunt et al. |
| 5,594,947 A | | 1/1997 | Grube et al. |
| 5,708,655 A | | 1/1998 | Toth et al. |
| 5,717,687 A | | 2/1998 | Minot et al. |
| 5,719,563 A | * | 2/1998 | Thompson, Jr. ......... 340/870.02 |
| 5,799,016 A | | 8/1998 | Onweiler |
| 5,799,153 A | | 8/1998 | Blau et al. |
| 5,917,433 A | | 6/1999 | Keillor et al. |
| 5,959,275 A | | 9/1999 | Hughes et al. |
| 5,974,453 A | * | 10/1999 | Andersen ................ H04L 61/10 709/220 |
| 6,041,228 A | | 3/2000 | Niska et al. |
| 6,084,544 A | | 7/2000 | Camp, Jr. |
| 6,094,659 A | * | 7/2000 | Bhatia ................ H04L 12/5692 375/222 |
| 6,115,754 A | | 9/2000 | Landgren |
| 6,359,871 B1 | | 3/2002 | Chung et al. |

(Continued)

*Primary Examiner* — Vernal Brown
(74) *Attorney, Agent, or Firm* — Hartman & Citrin LLC

(57) ABSTRACT

A method provides for real-time asset location tracking. An asset in a wide area network, be it a utilities network or a communication network, registers itself with a network management center. The registration process includes identification of a physical location of the asset usable for mapping and tracking the asset.

17 Claims, 6 Drawing Sheets

(56) References Cited

U.S. PATENT DOCUMENTS 6,396,828 B1 5/2002 Liu
7,639,157 B1 * 12/2009 Whitley et al. .......... 340/870.02

* cited by examiner

METHOD FOR LOCATION-BASED ASSET MANAGEMENT

CROSS-REFERENCE TO RELATED APPLICATION

This application is a continuation of U.S. patent application Ser. No. 10/939,366 filed 14 Sep. 2004, now U.S. Pat. No. 7,579,960, which is a continuation of U.S. patent application Ser. No. 09/326,088 filed 4 Jun. 1999, now U.S. Pat. No. 6,806,813 B1, which claims priority to provisional application 60/113,167 to Cheng et al., filed on Dec. 21, 1998 and entitled "METHOD FOR LOCATION BASED ASSET MANAGEMENT", the entirety of which is hereby incorporated by reference.

BACKGROUND

The present invention is directed to a method for tracking assets. More particularly, in a network service environment it is beneficial to track assets, such as various pieces of equipment, that are installed to support the network. The present invention improves upon known asset tracking systems by providing a real-time location-based asset tracking technique.

Asset Tracking Systems (ATS) are used in many companies to keep track of their field installations and inventory. Traditionally these kinds of systems are built around a central database designed to store information about the various field components. Updating of such a known database is done through manual processes such as field visits, barcode reading, remote database update by field technicians, etc. For a large distributed system, such as a telecommunication network or a utility network (gas, electricity, water, etc.), this kind of maintenance is very labor intensive (and consequently expensive). It is also time consuming to perform such maintenance. As a consequence of this expense and time commitment, the inventory information of a network may be less frequently updated. Many business activities that rely on correct asset tracking information are not able to perform timely and accurately with such infrequently updated databases. Today, the competition in the communication industry is getting ever stronger, and the technology is changing rapidly. A more responsive, timely, asset tracking system would be advantageous to maintain a competitive edge.

Once the updated information is gathered, and accumulated, it would be beneficial if there were a more meaningful way to present this information to a user.

SUMMARY OF THE INVENTION

The present invention provides a real-time location-based asset tracking system. The tracking system is based on an innovative location-based asset tracking engine.

According to one embodiment of the present invention, a network asset registers itself with a central database. The central database may be associated with a network operations center. A request to register the asset is generated automatically at initial power on after installation or at some other designated time post-installation. According to further variations on the embodiment, the asset may report not only installation location information, but also status information about the particular asset.

In a further variation on this embodiment, the asset-related information stored in the central database can be combined with map information such as a map representing a region or a service area. The combination of map and asset-related information yields a map that can be displayed and can include various information about the asset or assets associated with that region or service area.

According to the present invention, the techniques of asset tracking can be employed in wide area (distributed) systems such as a communication network, (e.g., a wireless service network) or a utility network (e.g., gas, electricity, water, etc.).

DETAILED DESCRIPTION

Introduction and Overview

The present invention provides a method and a system by which assets of a wide area or distributed network can be tracked. This tracking information can then be put to use by network managers. For example, the tracking information can identify the location of the asset. If the manager has such location information, he or she can develop a better overall view of asset allocation and/or status in the network. This can assist in planning the provisioning of new assets or in responding to a more immediate need to service, repair, or replace an asset.

The tracking information gathered or registered can be presented to a user (e.g., network manager) in the form of a display. In one embodiment, the display is capable of presenting location and/or status information (including alerts) in terms of a map representation. The display makes it possible to provide multiple levels of details as regarding any one area.

The present invention can be employed in networks such as communication networks or utility networks (e.g., gas, electricity, water, etc.). The remainder of this description, however, will focus on an implementation of the present invention in a communication network. The description refers to an implementation of the present invention in a cellular network. Other communication networks can gain from the asset tracking techniques described above and below. Furthermore, while the example described refers to installation of a base station, it should be understood that the present invention could be used in connection with other network equipment such as remote units (for example, a transceiver in a fixed wireless communication system).

Figure 1:
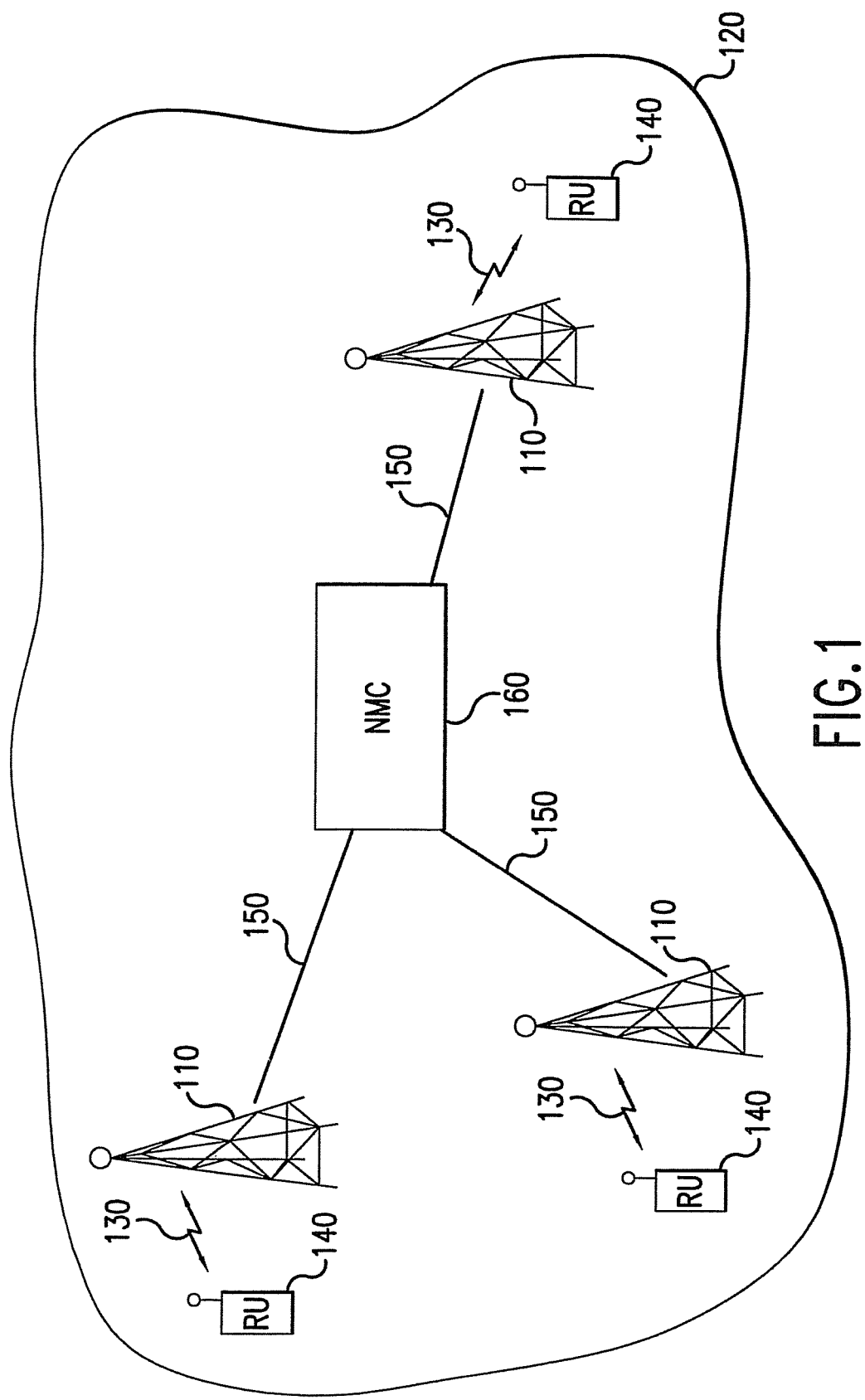
FIG. 1 is a block diagram of a network with which an embodiment of the present invention can be employed.

FIG. 1 illustrates an example of a system in which the present invention can be employed. This exemplary system is a wireless communication network in which a plurality of base stations 110 are provisioned throughout an area or region 120. The base station provides a radio interface 130 to one or more remote units 140 which can be mobile or stationary (fixed). The base station also provides an interface to a wireline connection 150 that can couple the base station to a network management center 160.

Figure 2:
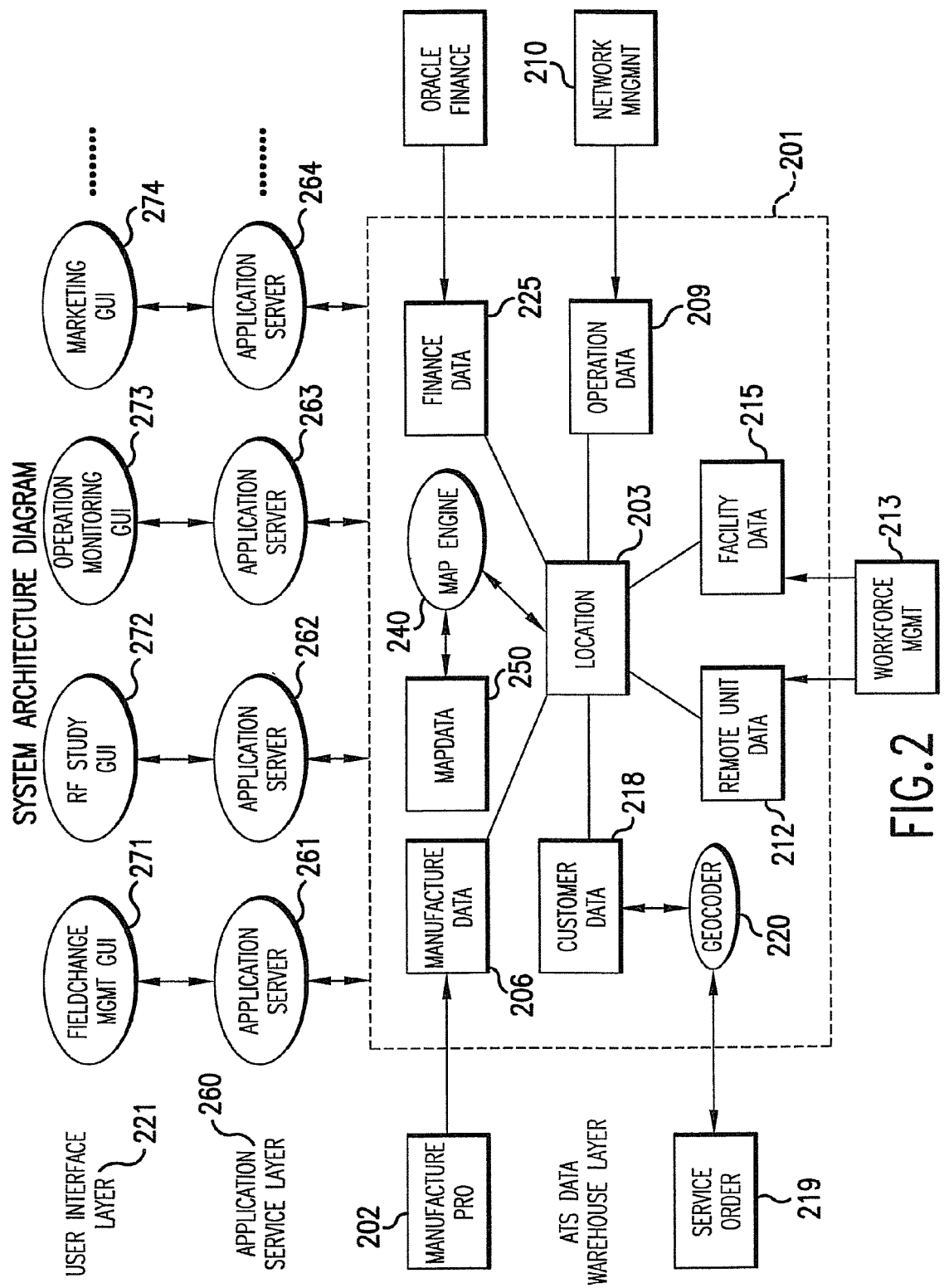
FIG. 2 illustrates a block diagram of an architecture for a system in accordance with an embodiment of the present invention.

At the foundation of the system is a data warehouse with database connections to various operation systems in the company. As depicted in FIG. 2, at the center of the data warehouse is a location data repository 203 which contains all of the geographic locations occupied by company facilities.

That location data repository 203 is loaded as described below. Furthermore, as it rests at the heart of the data warehouse layer 201 of the asset tracking system (ATS), the repository 203 is coupled to various data sources such as: manufacture data 206 influenced by the manufacturing process 202; operation data 209 influenced by network management 210; remote unit data 212 and facility data 215 influenced by work force management 213; customer data 218 influenced by the receipt of service orders 219 from customers and by geocoding (220) (that is, location identifying) of customers identified in service orders. Finance data 225 is also available.

The location data also plays an important part in the presentation of asset information. Thus, the location repository 203 is coupled to a map engine 240 capable of integrating map data 250 and asset location information from the location repository 203. The result is one or more maps representing asset location and status information for review by a user such as a network manager. On top of the data warehouse layer 201 is the application service layer 260 that includes a plurality of application servers (261 to 264) which provide the application logic to different business functions originated from a top user interface layer 221. These functions are presented as various Graphical User Interfaces (GUIs) such as: a Field Change Management GUI 271; an RF Study GUI 272; Operation Monitoring GUI 273; and Marketing GUI 274.

The present invention can provide a real-time asset tracking system for new services offered by a communications network such as a wireless service provider.

It should be noted that a number of companies have been using mapping technology to manage their facilities and many publications can be found in Geographic Information System (GUS) related magazines and conference proceedings. However, there are a couple of key differences between these related works and the present invention.

First, the present invention provides automatic database population.

The related work generally requires two stages to implement a map-based asset tracking system. In a first stage, paper maps must be marked with equipment locations and then these paper maps are converted into some electronic format through manual digitization. In a second stage, all installed equipment information that ties in with the corresponding entities on maps must be entered in the database. The whole process usually lasts several months or even years. This slow process is definitely not acceptable in many industries, like the wireless services industry, where new sites are being built rapidly and service territories are constantly changing.

In accordance with the present invention, using a real-time location-based asset tracking engine, the asset database is populated automatically.

Figure 3:
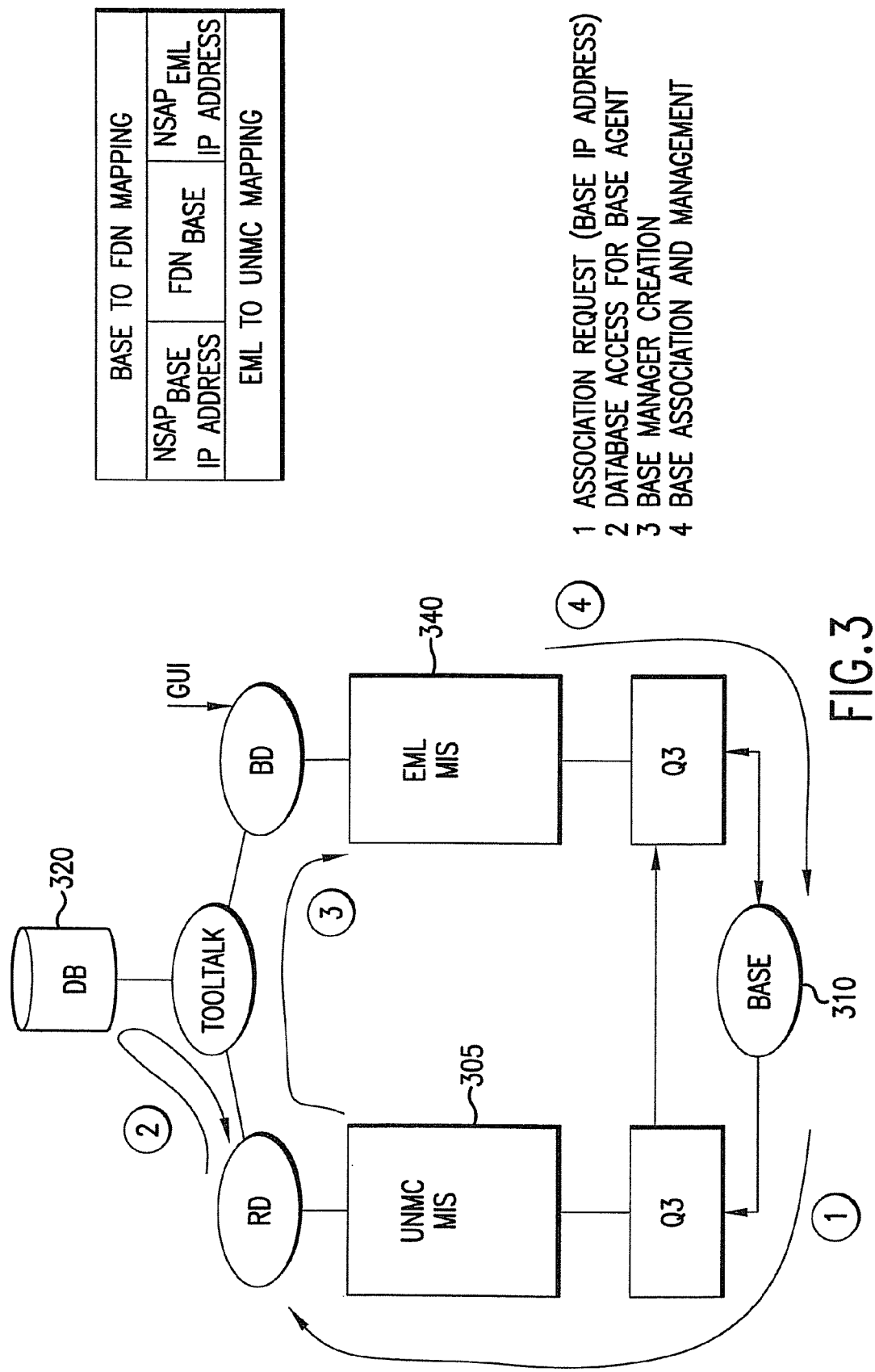
FIGS. 3 and 4 are flow diagrams related to an embodiment of the present invention.
Figure 4:
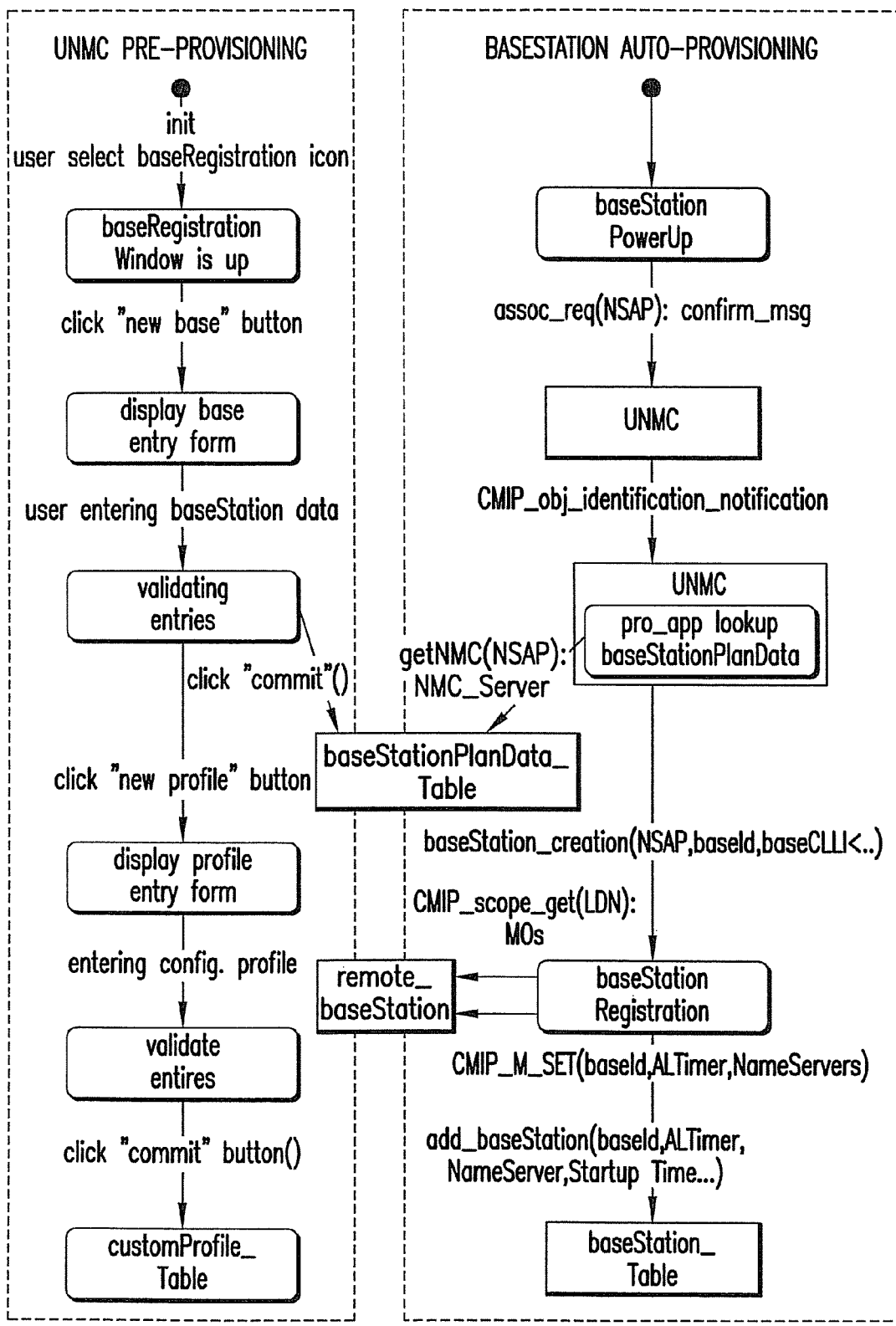

There are primarily two ways to populate the facility data in this asset database. For the base station related facility, after it is installed and powered on, the asset, for example a base station, will report to a well-known server. The well-known server then notifies the corresponding network management system to perform the management activity on the newly reported asset. FIG. 3, described below, provides a flow diagram relating to registration of the asset. Once the network management system connects to the asset, location data, which could be collected by a Global Positioning System (GPS) receiver mounted on the asset, are transmitted to the network management system, which in turn passes the data to the ATS database.

Another mechanism to generate the location data involves a "geocoding" process. In that process, when a customer orders a service, the customer's street address is processed by a geocoding engine such as the Map Marker from MapInfo to generate location coordinates for the asset in the database. After a field technician installs the remote unit in the customer premise, the remote unit is linked to the location entry in the database through the network management system.

Another difference from prior tracking systems is that the present invention provides real-time asset tracking.

One of the advantages of the ATS is the ability to provide real-time answers to the questions: "At this moment, what is installed and where is it?" Most other ATS implementations are not able to meet this basic requirement. In the present invention, however, all the facility-related information is tied through a common denominator—the location. The moment after an asset or equipment is installed in the field, it is inserted into the ATS database, and it is available to be included in various business operations and analysis. For instance, the manufacturing system can quickly estimate the operational impact if a specific hardware needs to be upgraded; the finance department may decide which facility can start the depreciation after its installation; and the RF engineers can observe the system capacity utilization and tune the system performance accordingly. This corresponds to the System Architecture diagram of FIG. 2.

The remaining sections of this disclosure will first provide a description of the process by which asset data is acquired. Then there is a description of how the gathered data may be presented.

Acquiring Asset Data

A. Introduction

A Universal Network Management Center (UNMC) is a centralized structure that defines the layers in which a Personal Wireless Access Network (Pwan) is organized and handles provisioning as the network expands.

The UNMC is a piece of software that uses O.N.E. Software's Association Control Service Element (ACSE) Presentation Layer Interface library (APLI) to open a service access point (SAP) and listen for association indications from a Pwan asset (in this instance and hereafter in the description, a base station) that is re-starting. It is the first thing that the PwanBase connects with in a network operations center (NOC) and it provides a mechanism to trigger the Network Managing Center (NMC) to begin managing the PwanBase.

FIG. 3 provides a block flow representation of how a base station registers with the UNMC to become managed by an NMC.

When the UNMC 305 receives an association request (Step 1) from a PwanBase 310 (called an association indication), it then reads the Network layer Service Access Point (NSAP address) of the base, along with the T-Sel, S-Sel, and P-Sel (Transport Selector, Session Selector, and Presentation Selector). These four items uniquely identify the PwanBase CMIP (Common Management Information Protocol) agent on the network, and together form the address that the NMC will need to use to contact the PwanBase 310 and begin a network management dialog.

Upon determining the set of {Nsap, TSel, Ssel, Psel}, hereafter referred to as the AE-Title (Application Entity Title), the UNMC 305 responds to the PwanBase 310 by sending an Association Confirmation. The AE-Title is all the information required from the PwanBase 310 by the UNMC 305 to trigger the rest of the management task. After the PwanBase 310 receives the Association Confirmation from the UNMC 305, the PwanBase 310 sends a Release Indication, and the UNMC 305 responds with a Release Confirmation.

The UNMC 305 uses the NSAP address to look up the PwanBase 310 in pre-provisioning tables provided in the NMC database 320 (step 2). The pre-provisioning tables can be created at the time of manufacture or shipping and include information sufficient to identify the equipment or asset. This information is used to determine the baseId, the managing NMC application, and the object identifier used to refer to the PwanBase 310 within the NOC.

Assembling this information into a ToolTalk message within an op-code of NmcAddBaseRequest, the UNMC 305 is now ready to send the request to the NMC's element manager layer (EML) 340, step 3.

The NmcAddBaseRequest causes the EML 340 to attempt to connect to the PwanBase 310 and begin managing (step 4). If the association request is successful, the EML 340 sends a ToolTalk response to the UNMC 305, and the UNMC 305 can now consider the transaction complete.

After the PwanBase 310 has been contacted by the NMC, the next message it receives is a CMIP scoped M-GET request for all of its management information tree (MIT) objects. This management information includes such things as location information. Such information can be determined by the asset itself using a location detector coupled to the asset. One such detector could be a GPS position receiver coupled to the asset. This detector could then provide location information back to the NMC.

If the network association between the NMC and the PwanBase 310 is broken, the PwanBase 310 again makes contact with the UNMC 305. This allows the UNMC 305 to allocate a particular PwanBase 310 to a different NMC each time it registers, thereby permitting load-leveling.

In connection with the pre-provisioning referred to above, the Base preprovisioning GUI provides domain-to-NMC mapping, Base ESN (electronic serial number) (unique 32-bit)-to-Base station mapping, and general Base information.

The GUI application receives Base CLLI code, latitude and longitude (optional), region, market, LSA, and backplane ID. The backplane ID is used by the Base as a network address and as a database key in the UNMC 305.

The UNMC manager communicates structural hierarchy information to the NMC agent as new Base NEs are added to the network. The UNMC manager listens for Base existence announcements. A Base sends an association request to the UNMC 305, which responds with an association request confirmation. The UNMC 305 reads the Base network address from the association information. The Base then sends an association termination message to the UNMC 305, which responds with an association termination confirmation message.

Upon receiving a new Base existence notification, the UNMC manager looks up the domain to determine the managing NMC; the NMC domain table is provisioned by Network Operations (Net Ops). The manager looks up the Base ID, a unique 32-bit identifier, from the Base station table provisioned by Net Ops.

The UNMC manager then sends a create base station message to the NMC manager. If the create message fails after three attempts, the UNMC 305 reports the failure to an internal management system. Assuming the message is successful, the UNMC 305 marks the Base as existing.

One advantage of the design philosophy of the present invention is that it eliminates the requirement for the NMC to continually "poll" for new bases coming online. A new base may be identified and provisioned in the NMC database months in advance of the actual physical installation. Also, the actual location on the management network may not be known. The subnet where the base will reside is dependent on the network provider, and won't necessarily be known at the time of pre-provisioning.

A mechanism then allows the PwanBase 310 to contact the NOC when it is ready to be managed. The mechanism encompasses a combination of the Dynamic Host Configuration Protocol (DHCP), and the UNMC 305.

DHCP is a method of allocating network addresses to clients in an IP-based network. The client uses some unique number (typically, the number is the "Mac" layer address, such as an ethernet address) to identify itself to a DHCP server. The DHCP server maintains a record of ethernet/subnet to IP address mappings. The DHCP server also has a cache of unused addresses for each of the subnets it has responsibility over, which it can then dole out to new clients as needed.

Three players are involved in the DHCP system: a DHCP client, a DHCP server, and a DHCP relay agent. The relay agent is a "point of presence" on the clients' network, typically built into the router.

Presume a machine is attached to a network, where it has been given no information about what network address to use. The client constructs a DHCP discover packet. In it, the client places its ethernet address, leaving the gateway address field blank. The client then broadcasts the packet onto the local network using a Mac-layer and network layer broadcast address (0xffffffffffff and 255.255.255.255 respectively).

At this point, the broadcasted packet is read off of the network by a DHCP relay agent built into the router. The router must be configured with an ip_helper_address which points to the DHCP server. The router then writes its own IP address of the interface at which the packet originally arrived into a field in the DHCP discover packet called the "gateway IP address" field. The router then unicasts the packet to the DHCP server.

When the DHCP server then receives the packet, it now has a globally unique number identifying the client, and it also knows what subnet the client is on because it has the router's IP address. The DHCP server looks in its database for the last known IP address of the client, and then does a cross-check to make sure that the address is valid in that particular subnet. If not, the server de-allocates the client's existing address and grabs a new one from its pool of available addresses.

The server constructs a DHCP offer packet, and unicasts the packet back to the interface on the router that connects to the network the client is on. The relay agent, built into the router, receives the packet, recognizes it as a DHCP response packet bound for the particular subnet, and broadcasts the packet onto the local subnet.

The client, though it doesn't know its own network address, is able to read broadcast packets. It reads the DHCP offer packet, matches the transaction identifier (xid) with the packet it originally sent, and also double-checks the mac-layer address, just to make sure it is the rightful heir to the newly acquired IP address.

Since more than one DHCP server could respond, the process is repeated with a DHCP request and a DHCP acknowledge packet; both contain the newly offered IP address.

Upon receiving the DHCP acknowledge packet, the client records the lease duration for the address and begins using it. The DHCP acknowledge packet also contains the name server address, router addresses, and anything else the client will need to know in order to be a full-fledged member of the network. The parameters delivered in the DHCP mechanism are extendible, and can be extended by specifying vendor specific options or site specific options. The UNMC address will be delivered to the PwanBase in a site-specific option field.

The DHCP relay agent built into the router is under the control of the network provider. However, it does require one of the following two solutions:

1. That the routers be configured to send the DHCP packets to a DHCP server maintained by Net Ops.
2. That the DHCP servers managed by the network provider be updated to deliver the UNMC address to the PwanBase along with the rest of the configuration information.

Solution 2 covers the eventuality that the network provider will be implementing DHCP and will have the relay agents in the routers pointing to DHCP servers maintained by the network providers themselves; this will probably be the case.

A third solution has been identified which takes advantage of the plan to have all of the PwanBases attached to dedicated routers. If this turns out to be the case, these routers can be configured to have their relay agents pointing to isolated DHCP servers maintained specifically for the PwanBases.

Thus, the present invention provides a unique technique by which a centralized database is updated to maintain real-time status information concerning a plurality of network assets.

Using a Geographic Information System

The scale of some wide area networks is potentially very large. For example, up to 20,000 base stations (BS) and 40,000,000 remote units (RU) will be installed from coast to coast in the proposed PWAN System according to the latest project estimates. To efficiently and effectively manage such a large volume of facilities over a wide geographic area, Geographic Information System (GIS) technology is utilized as part of the graphic user interface in the Network Operation Center (NOC).

The GIS package selected in one particular embodiment is Smallworld GIS, provided by SmallWorld of the United Kingdom, currently a leading GIS product in the industry. The advantages of the Smallworld GIS include: its object-oriented technology, a powerful version managed database system, and a fast prototyping environment.

Figure 5:
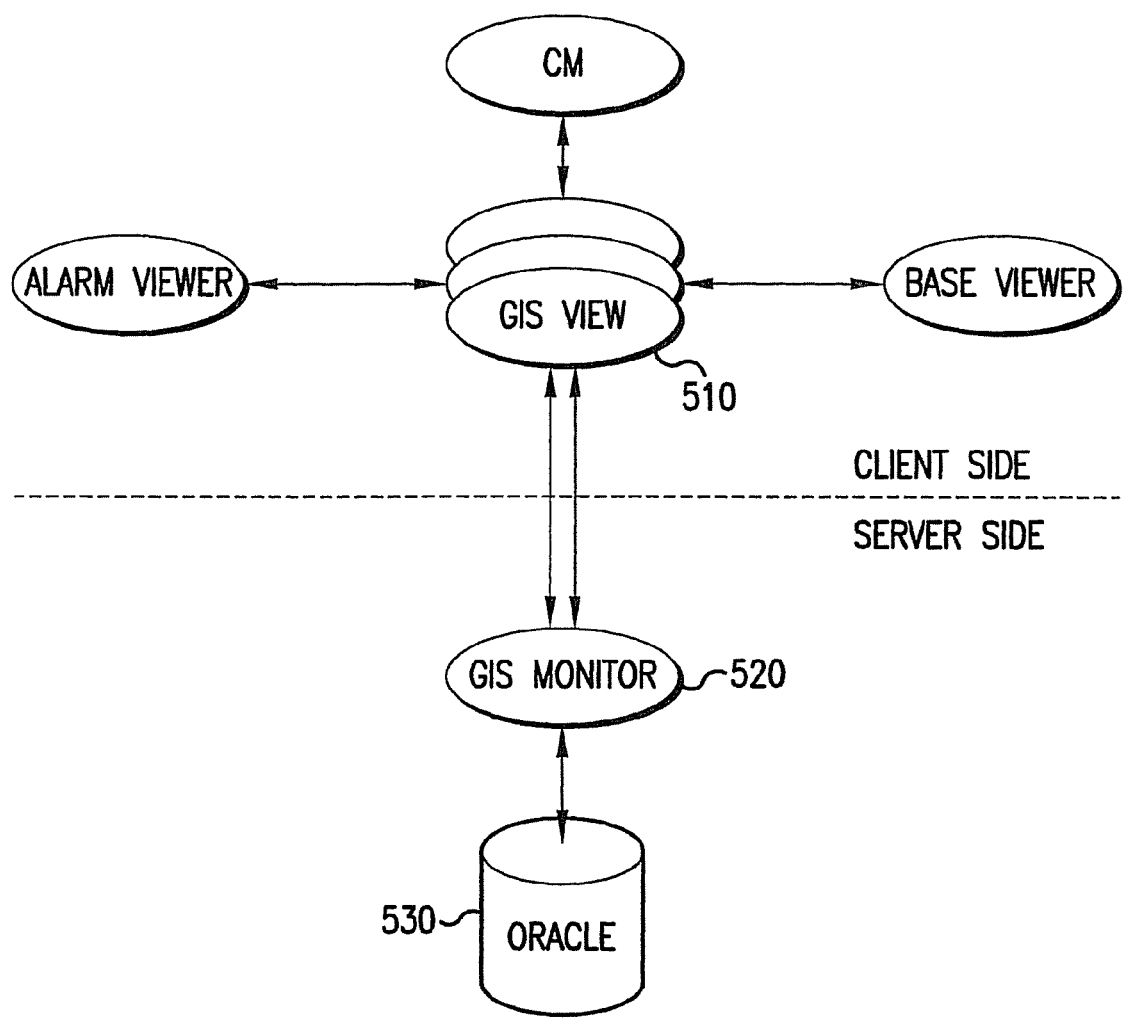
FIG. 5 illustrates a block diagram of a system for presenting information in accordance with an embodiment of the present invention.

In general, there are two types of GIS components in the asset management system software configuration: a GIS Monitor running on the server side will handle the GIS database updates, such as introduction of a new RU, new base station, or change of an alarm status; a GIS View process initiated by the user will communicate with the GIS monitor to synchronize the GIS representation of the system and communicate with other WEMS components as a result of the operator's request. As depicted in FIG. 5, there could be multiple GIS Views 510 initiated by the users.

In order to provide consistent representations among multiple GIS views, the Smallworld database roll-forward mechanism is employed.

The GIS Monitor 520 process is constantly watching the Oracle database 530. Whenever a network status change occurs, the GIS monitor 520 will update the GIS database accordingly. On the GIS View 510 side, there is a timer for each GIS view 510 process. When the timer is up, typically set for 10 seconds, the GIS viewer will retrieve all the changes during this interval from the monitor and update the local database. If the changes occurred in the display area of the current screen, the screen will be refreshed as well. By limiting the update on a single process, the GIS monitor 520, it will guarantee all of the GIS views 510 have consistent representations.

Figure 6:
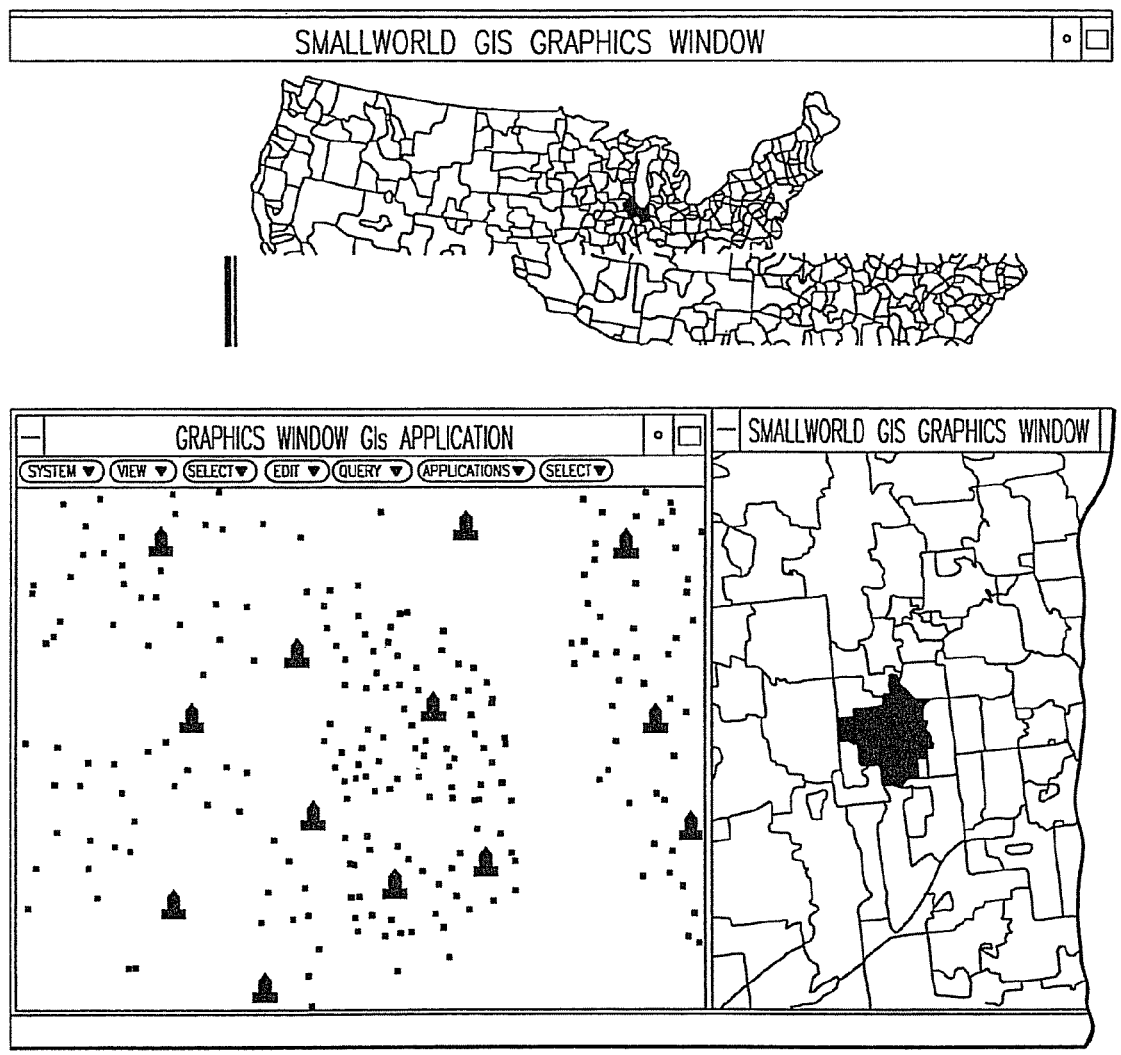
FIG. 6 illustrates an example of multiple display levels achievable with an embodiment of the present invention.

Because of the large volume of network elements monitored by the management system, it is not feasible to display all the base stations and remote units in the same graphic windows in an operation center. Therefore, a multi-scale display system is designed to provide different levels of abstraction. Currently, there are four display scales defined in the GIS view as shown in Table 1. A screen dump is shown in FIG. 6.

TABLE 1

| Scale Name | Visible Objects | Scale |
| --- | --- | --- |
| Overview | Regions, Markets | >1:100000 |
| Medium | LSAs (Local Service Areas) | 1:20000 < 1:100000 |
| Detail | LSAs, Base Stations | 1:10000 < 1:20000 |
| Very Detailed | Base Stations, RUs, Streets | <1:10000 |

The Smallworld Style system is also used to create the alarm status representation in the GIS view 510. A set of icons is predefined for base stations and RUs based on their 'alarm status' values. The shape of the icons are mostly the same, but the colors are different for different alarm severity. For LSA and Market maps, there are no specific icons used, but different colors are designed for polygon shading purposes. When an alarm is brought into the GIS monitor 520, the proper icons and colors will be chosen by the style manager for display.

Another effort on alarm status representation is definition of a set of mapping rules for LSA alarms and market alarms. Since a LSA and a Market represent a geographic area, an alarm on a LSA or a Market means either a base station or RU within the LSA or the market is generating the alarm. The main reason to 'propagate' the alarms up to the corresponding LSA and up to the market is to produce a simplified view at a higher level. The most simple rule to map the base station alarm and RU alarm to the LSA alarm is to always propagate the highest severity alarm. However, the side-effect of this approach is that the LSA map and Market map can become too sensitive because the probability of getting some alarms within a large group of network elements is higher than in a single network element. Therefore, a set of mapping rules is defined to allow the operator to specify under what conditions the alarm should be propagated up to a higher level. For example, the operator can specify that only when three critical alarms occurred within a LSA will the LSA be marked as critical. The operator can also specify a 'key base station', or a 'key RU' as the leading factor.

Many management activities can be taken by the operators at a NOC. Some of the activities are rather trivial. Others may be quite significant if they potentially affect the system behavior or even disable a network element. The Smallworld GIS has an authorization system which can group users into different levels and assign different system privileges to each group. Currently two user groups are defined, a monitor group and a user group. The monitor group can perform database updates while the user group can only read the database.

To communicate with other Wireless Element Management Systems (WEMS) software components, the Alien Co-processor (ACP) of Smallworld GIS is used as a main interface. When performing software download, for example, the proper tooltalk messages between Smallworld GIS and the CM will be handled in the ACP routines.

CONCLUSION

The present invention provides a method for tracking assets of a wide area or distributed network. The tracking system is tied into location monitoring where the asset itself reports its location after it is installed. The asset status information can be presented in a more comprehendible form, such as in map form, to ease management of the network assets.

The disclosed embodiments are illustrative of the various ways in which the present invention may be practiced. Other embodiments can be implemented by those skilled in the art without departing from the spirit and scope of the present invention.

What is claimed is:

1. An asset tracking system comprising:
   a computer processing unit; and
   a computer-readable medium that stores computer-executable instructions that, when executed by the computer processing unit, cause the computer processing unit to perform operations comprising:
      receiving, from an asset, via a dynamic host configuration protocol relay of a router, a packet comprising a mac-layer address of the asset and an internet protocol address of the router, wherein a gateway address field of the packet is left blank by the asset and filled in by the dynamic host configuration protocol relay of the router with the internet protocol address of the router,
      determining an internet protocol address mapped to the mac-layer address of the asset,
      assigning, to the asset, the internet protocol address mapped to the mac-layer address of the asset,
      transmitting, to the asset, via the dynamic host configuration protocol relay, an acknowledgement packet comprising the internet protocol address assigned to the asset,
      receiving, from the asset, an association request,
      based at least in part on receiving the association request from the asset, providing, to the asset, using the internet protocol address assigned to the asset, a request for a geographical location of the asset and for a status of the asset, the geographical location of the asset and the status of the asset being previously unknown by the asset tracking system,
      receiving, from the asset, in response to the request, the geographical location of the asset and the status of the asset, wherein the geographical location of the asset is determined by the asset using a location detector coupled to the asset, and
      passing the geographical location of the asset and the status of the asset to a data repository.

2. The asset tracking system of claim 1, wherein the asset tracking system communicates with the asset by way of a wireless transceiver associated with the asset.

3. The asset tracking system of claim 1, wherein the operations further comprise updating information related to the asset in the data repository to reflect the geographical location of the asset, yielding updated information.

4. The asset tracking system of claim 3, wherein the updated information is defined in terms of longitude and latitude.

5. The asset tracking system of claim 1, wherein the location detector comprises a global positioning system receiver coupled to the asset.

6. The asset tracking system of claim 1, wherein the asset is a product selected from a group of products consisting of a piece of electronic equipment and software.

7. The asset tracking system of claim 1, wherein the asset is an equipment component of a telecommunications network.

8. The asset tracking system of claim 1, wherein the asset is an equipment component of a utilities network.

9. The asset tracking system of claim 8, wherein the utilities network is selected from a group of utilities networks consisting of:
   a water utilities network;
   an electric utilities network; and
   a gas utilities network.

10. The asset tracking system of claim 1, wherein the operations further comprise determining, from the status of the asset, whether the asset requires work.

11. The asset tracking system of claim 10, wherein the work is selected from a group of types of work consisting of:
   service;
   repair;
   replacement; and
   upgrade.

12. A method comprising:
   receiving, by an asset tracking system comprising a computer processing unit, from an asset, via a dynamic host configuration protocol relay of a router, a packet comprising a mac-layer address of the asset and an internet protocol address of the router, wherein a gateway address field of the packet is left blank by the asset and filled in by the dynamic host configuration protocol relay of the router with the internet protocol address of the router;
   determining, by the asset tracking system, an internet protocol address mapped to the mac-layer address of the asset;
   assigning, by the asset tracking system, to the asset, the internet protocol address mapped to the mac-layer address of the asset;
   transmitting, by the asset tracking system, to the asset, via the dynamic host configuration protocol relay, an acknowledgement packet comprising the internet protocol address assigned to the asset;
   receiving, by the asset tracking system, from the asset, an association request;
   based at least in part on receiving the association request from the asset, providing, by the asset tracking system, to the asset, using the internet protocol address assigned to the asset, a request for a geographical location of the asset and for a status of the asset, the geographical location of the asset and the status of the asset being previously unknown by the asset tracking system;
   receiving, by the asset tracking system, from the asset, in response to the request, the geographical location of the asset and the status of the asset, wherein the geographical location of the asset is determined by the asset using a location detector coupled to the asset; and passing, by the asset tracking system, the geographical location of the asset and the status of the asset to a data repository.

13. The method of claim 12, wherein the asset is an equipment component of a telecommunications network.

14. The method of claim 12, wherein the asset is an equipment component of a utilities network.

15. The method of claim 14, wherein the utilities network is selected from a group of utilities networks consisting of:
 a water utilities network;
 an electric utilities network; and
 a gas utilities network.

16. The method of claim 12, further comprising determining, from the status of the asset, whether the asset requires work.

17. The method of claim 16, wherein the work is selected from a group of types of work consisting of:
 service;
 repair;
 replacement; and
 upgrade.

* * * * *